Sept. 27, 1949.  F. SEVEILHAC ET AL  2,483,353
PINCER DEVICE FOR REMOVABLY
SECURING A DENTAL PROTHESIS Filed June 3, 1947  2 Sheets-Sheet 1

INVENTORS
FRANCOIS SEVEILHAC, PIERRE SEVEILHAC,
LOUIS CAZENEUVE & PIERRE CATHARINA
BY
Young, Emery & Thompson  ATTYS.

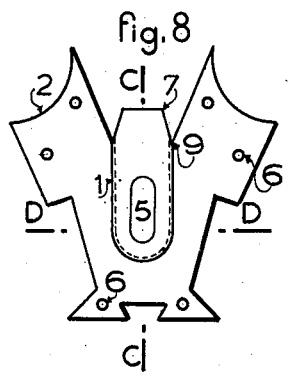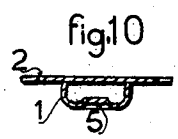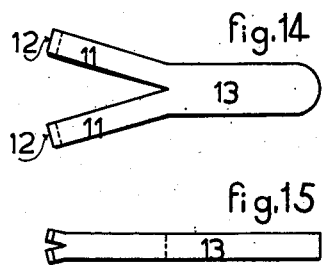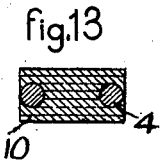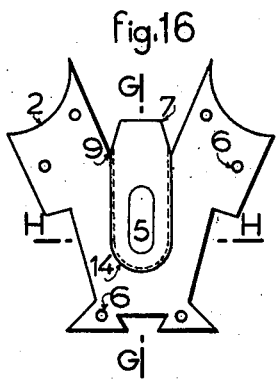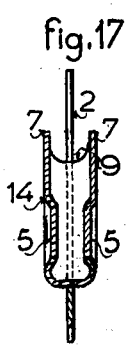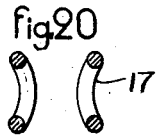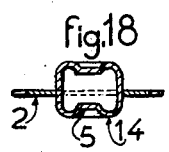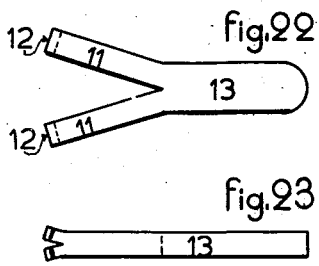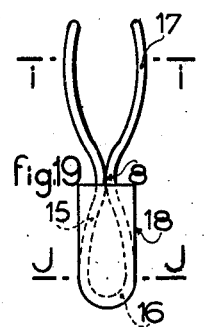

Patented Sept. 27, 1949

2,483,353

UNITED STATES PATENT OFFICE 2,483,353

PINCER DEVICE FOR REMOVABLY SECURING A DENTAL PROTHESIS

Francois Seveilhac, Pierre Seveilhac, Louis Cazeneuve, and Pierre Catharina, Toulouse, France Application June 3, 1947, Serial No. 752,037
In France June 4, 1946

Section 1, Public Law 690, August 8, 1946
Patent expires June 4, 1966

11 Claims. (Cl. 32—5)

1

This invention relates to a pincer device for removably securing a dental prothesis to an adjacent natural tooth.

According to this invention we provide a pincer device for removably securing a dental prothesis to an adjacent natural tooth, comprising a socket, means for rigidly fixing said socket to said prothesis, a soft plastic plug removably held within said socket and a pair of pincers having arms for gripping said natural tooth and having a base embedded in said plug.

According to this invention the pincer device has the advantage, compared with the hooks at present used in the dental art, of providing an anchorage which is completely invisible from the outer side of the mouth and thus improving the aesthetics and harmony of the prothesis.

Figure 1:
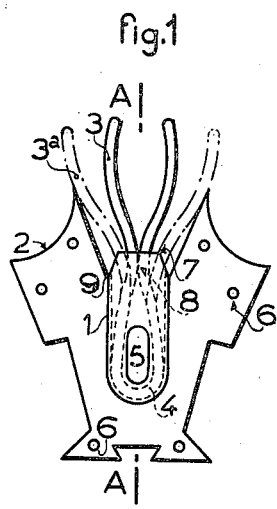
Figures 2, 3:
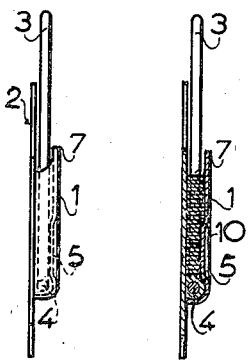
Figure 4:
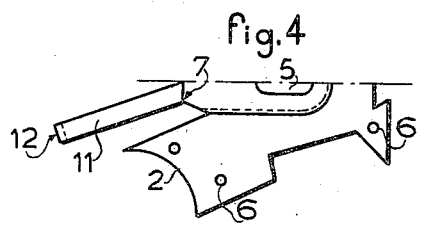
Figure 5:
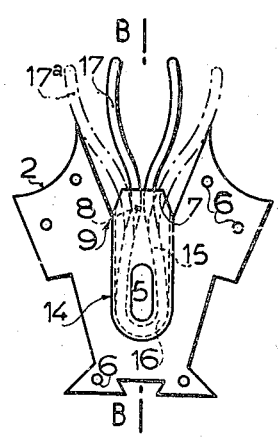
Figures 6, 7:
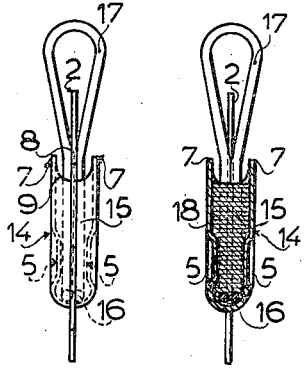

Some embodiments of the invention will now be described by way of example with reference to the accompanying drawings, in which:

Fig. 1 is a front elevation of one embodiment of the device having a simple pair of pincers, Fig. 2 is a side elevation thereof, Fig. 3 is a vertical section on the line A—A of Fig. 1, Fig. 4 is an elevation showing one half of a tool used in the course of manufacture, Fig. 5 is a front elevation, analogous to Fig. 1, showing a second embodiment of the invention having a pair of double pincers, Fig. 6 is a side elevation thereof, Fig. 7 is a section on the line B—B of Fig. 5, Fig. 8 is a front elevation showing only the socket of the embodiment shown in Fig. 1, Figs. 9 and 10 are sections taken respectively on the lines C—C and D—D of Fig. 8, Fig. 11 is a front elevation showing the pincers and plastic plug removed from the socket shown in Fig. 8, Figs. 12 and 13 are sections taken respectively on the lines E—E and F—F of Fig. 11, Figs. 14 and 15 are respectively a plan view and side elevation of an auxiliary plate used in the manufacture, Fig. 16 is a front elevation showing the socket of the embodiment shown in Fig. 5, Figs. 17 and 18 are sections taken respectively on the lines G—G and H—H of Fig. 16, Fig. 19 is a front elevation showing the pair of

2 double pincers and the plastic plug removed from the socket shown in Fig. 16,

Figs. 20 and 21 are sections taken respectively on the lines I—I and J—J of Fig. 19, and Figs. 22 and 23 show respectively a plan view and a side elevation of an auxiliary plate employed in the manufacture of the second embodiment.

Referring now to Figs. 1, 2 and 3 of the drawings, the device consists essentially of a socket in the interior of which a pair of elastic pincers is disposed.

The socket, which is shown by itself in Figs. 8, 9 and 10 consists of a cup 1, fixed by any appropriate means such as soldering to a retaining plate 2, both parts preferably being made of a corrosion-resistant material such as a non-oxidisible metal.

The cup 1 is provided on one side only with an opening serving for the introduction of the pair of pincers 3 and is closed around the rest of its periphery by a lateral wall the part of which lying opposite to the said opening is of generally cylindrical form adapted to fit the contour of the median bend 4 of the above-mentioned pair of pincers.

In the face of the cup 1 is formed a depression 5 with semi-circular ends which assist in retaining the said bend 4.

The plate 2 is of suitable thickness and generally plane and is rigidly secured to the cup 1, and has a marginal portion surrounding the cup having a contour cut out in more or less complex fashion to form intricacies which assist in securing the plate rigidly in the plastic material in which it is to be incorporated. The plate 2 is provided with perforations 6 into which the plastic material can penetrate.

The front face of the cup is preferably of such a height that a tongue 7 formed in the upper part thereof adjacent the opening which receives the pincers, co-operates with the latter as the prothesis is placed in the mouth, whilst the plate 2 assumes the same profile.

As shown in detail in Figs. 11 and 12, a pair of pincers is very simply formed from a rod of appropriate quality, for example of non-oxidisable metal, the length of which may be varied to adapt it to the dimensions of the natural tooth, whilst its diameter corresponds to the necessary requirements of resistance and elasticity.

At the centre of its length this rod is bent to form a bend 4 whilst the two free arms 3 first progressively converge until they touch and then diverge again and are finally bent inwards to adapt them to the form of the natural tooth. The profile of the pair of pincers is so designed that when the latter is put in place the point of junction 8 of the said arms is disposed a little beyond the lip 9 of the lateral wall of the opening of the passage.

On the other hand the bend 4 is embedded in the body of a plug 10 made of a soft plastic material of appropriate characteristics which encases the bend and serves to maintain the pincers in the concavity of the socket constituted by the combination of the plate and the cup and serves also to ensure that the socket is kept tight against any undesired entry of foreign bodies, whilst it permits the separation and closure of the arms 3, the expanded position of which is shown in broken line at 3a.

The plug is previously made by filling an auxiliary mould having the same internal dimensions as the cavity of the socket, for example with soft dental rubber.

As shown in Fig. 4 a lamellar support shown separately by the detail figures 14 and 15 may advantageously be introduced into the interior of the cup 1 so as to ensure that the socket is maintained in place during the operation of embedding the latter in the prothesis.

This auxiliary tool formed of malleable metal is of Y-shape, the two arms 11 being slightly split along their thickness on their end 12 and then opened after the manner of sealing claws.

In the modification illustrated in Figs. 5, 6 and 7 the device may be provided with a pair of double pincers.

The socket is then composed of two elements each stamped out from a single piece and which are then combined by any suitable means to form a cup 14 having two planes of symmetry carried by a retaining plate 2 similar to that above described.

As shown clearly in Fig. 17 the plate 2 is disposed in the plane of symmetry of the cup parallel to the two faces thereof, the total width of the latter being suitable in this case for receiving the two adjacent anchor bends of the pincers, all the other dimensions remaining unchanged.

In this case the pincers 15 are formed from a ring made from a rod similar to the above-described rod, the perimeter of which is chosen appropriately as a function of the volume of the natural tooth, and bent so that it forms two first bends 16 side by side, of the same shape as that designated by the reference numeral 4 in the pair of simple pincers 3 (see Fig. 11).

At the lever of the zone of junction 8 referred to above, there may be in this case, in the closed position, four junction arms which are joined in pairs by an arc such as 17, similar to the above-mentioned arc, as shown in particular in Figs. 6 and 7, intended to fulfil the same role of gripping as each of the free ends 3 of the simple pincers.

Figs. 19 and 20 and 21 show clearly the circuit followed by the rod and the first of these figures also shows that each of the above-mentioned arcs is contoured so as to conform to the natural tooth.

As in the foregoing case the adjacent anchor bends 16 are jointly embedded in a soft plastic plug 18 disposed in the interior of the cup of the socket and providing the advantages already mentioned.

In order to assist in the manufacture of the apparatus, a lamellar support is provided shown in detail in Figs. 22 and 23, which differs only from the first described lamellar support in the fact that it is thicker in conformity with the width of the cavity of the cup 14 into which it is to be fitted.

When the device is to be applied to the manufacture of protheses of stamped or cast metal, the plate to which the cup is secured is provided with a margin surrounding the latter of a width appropriate to its fixation by operations such as soldering, brazing or the like.

It is apparent from the foregoing description that the present device may advantageously replace the known means such as hooks especially in the case of very low joints.

Because of its elasticity and suppleness the pincer device ensures an optimum retention of the protheses in the mouth in which they are restrained from any lateral movements which would impair perfect occlusion.

It is a further advantage of the device that the pincers are independent of the prothesis and may readily be removed and exchanged without the necessity of direct repair of the prothesis.

Finally, the device assists in disengaging the said prothesis at the level of the natural teeth which contributes to a maximum of hygiene.

We claim:

1. A pincer device for removably securing a dental prothesis to an adjacent natural tooth, comprising a socket, means for rigidly fixing said socket to said prothesis, a soft plastic plug removably held within said socket, and a pair of pincers having arms for gripping said natural tooth and having a base embedded in said plug.

2. A pincer device for removably securing a dental prothesis to an adjacent natural tooth comprising a plate adapted to be rigidly fixed to said prothesis, a cup rigidly secured to said plate and co-operating with said plate to form a socket, a soft plastic plug removably held within said socket, and a pair of pincers having arms for gripping said natural tooth and having a base embedded in said plug.

3. A pincer device for removably securing a dental prothesis to an adjacent natural tooth, comprising a plate, a cup rigidly secured to said plate and co-operating with said plate to form a socket, a marginal portion of said plate surrounding said socket of suitable width and contour for rigid fixation to said prothesis, a soft plastic plug removably held within said socket, and a pair of pincers having arms for gripping said natural tooth and having a base embedded in said plug.

4. A pincer device for removably securing a dental prothesis of plastic material to an adjacent natural tooth, comprising a plate, a cup rigidly secured to said plate and co-operating with said plate to form a socket, a marginal portion of said plate surrounding said cup, said marginal portion being suitably dimensioned and contoured for embedding in the plastic material of said prothesis, apertures in said marginal portion for admitting entry of said plastic material, a soft plastic plug removably held within said socket, and a pair of pincers having arms for gripping said natural tooth and having a base embedded in said plug.

5. A pincer device for removably securing a metallic dental prothesis to an adjacent natural tooth, comprising a metal plate, a metal cup rigidly secured to said plate and co-operating with said plate to form a socket, a marginal portion of said plate surrounding said cup, said marginal portion being of substantially uniform width and being adapted to be affixed to said prothesis by a fused metal joint, a soft plastic plug removably held within said socket, and a pair of pincers having arms for gripping said natural tooth and having a base embedded in said plug.

6. A pincer device for removably securing a dental prothesis to an adjacent natural tooth, comprising a socket, means for rigidly fixing said socket to said prothesis, a soft plastic plug removably held within said socket, a pair of pincers having arms for gripping said natural tooth and having a base embedded in said plug and a depression in at least one wall of said socket for gripping said plug and said pincers.

7. A pincer device for removably securing a dental prothesis to an adjacent natural tooth, comprising a socket, means for rigidly fixing said socket to said prothesis, a soft plastic plug removably held within said socket, a pair of pincers having arms for gripping said natural tooth and having a base embedded in said plug, and means for guiding the opening and closing of said arms.

8. A pincer device for removably securing a dental prothesis to an adjacent natural tooth, comprising a socket, means for rigidly fixing said socket to said prothesis, a soft plastic plug removably held within said socket, and an elastic non-oxidisable rod bent upon itself to form a pair of pincers having arms for gripping said natural tooth and a base embedded in said plug.

9. A pincer device for removably securing a dental prothesis to an adjacent natural tooth, comprising a socket, means for rigidly fixing said socket to said prothesis, a soft plastic plug removably held within said socket and a closed endless length of elastic non-oxidisable rod bent to form a pair of double pincers having a pair of double arms for gripping said natural tooth and a double base embedded in said plug.

10. A pincer device for removably securing a dental prothesis to an adjacent natural tooth, comprising a socket, means for rigidly fixing said socket to said prothesis a soft plastic plug removably held within said socket, and an elastic non-oxidisable rod bent upon itself to form a pair of pincers having arms for gripping said natural tooth and a base embedded in said plug, said arms in the closed position of the pincers first converging from said base to touch one another, and thereafter following a contour, corresponding to that of said natural tooth such that said arms first diverge and then again converge.

11. A pincer device for removably securing a dental prothesis to an adjacent natural tooth comprising a socket, means for rigidly fixing said socket to said prothesis, a soft plastic plug removably held within said socket and a closed endless length of elastic non-oxidisable rod bent to form a pair of double pincers having a pair of double arms for gripping said natural tooth and a double base embedded in said plug, said double arms in the closed position of the pincers first converging from said double base to touch one another, and thereafter following a contour, corresponding to that of said natural tooth, such that said double arms first diverge and then again converge.

FRANCOIS SEVEILHAC.
PIERRE SEVEILHAC.
LOUIS CAZENEUVE.
PIERRE CATHARINA.

REFERENCES CITED

The following references are of record in the file of this patent:

UNITED STATES PATENTS

| Number | Name | Date |
| --- | --- | --- |
| 1,479,439 | Williams | Jan. 1, 1924 |
| 2,003,030 | Amenta | May 28, 1935 |